US012686304B2

(12) United States Patent
Cherukuvada

(10) Patent No.: US 12,686,304 B2
(45) Date of Patent: Jul. 21, 2026

(54) SEATBACK FOLD FLAT WITH LOCK

(71) Applicant: GM GLOBAL TECHNOLOGY OPERATIONS LLC, Detroit, MI (US)

(72) Inventor: Venkata Narasimha Rao Cherukuvada, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 183 days.

(21) Appl. No.: 18/424,398

(22) Filed: Jan. 26, 2024

(65) Prior Publication Data

US 2025/0242732 A1 Jul. 31, 2025

(51) Int. Cl.
B60N 2/36 (2006.01)
B60N 2/015 (2006.01)

(52) U.S. Cl.
CPC ......... B60N 2/366 (2013.01); B60N 2/01516 (2013.01); B60N 2/01525 (2013.01); B60N 2/01558 (2013.01); B60N 2/01566 (2013.01)

(58) Field of Classification Search
CPC ............ B60N 2/01516; B60N 2/01525; B60N 2/01558; B60N 2/01556; B60N 2/366
See application file for complete search history.

(56) References Cited

U.S. PATENT DOCUMENTS

2019/0077284 A1 3/2019 Jacob

FOREIGN PATENT DOCUMENTS

| DE | 19627853 A1 | 1/1998 |
| DE | 10249100 A1 | 5/2004 |
| DE | 202008014250 U1 | 3/2009 |
| DE | 102014103801 B3 | 11/2014 |

*Primary Examiner* — Nicholas McFall
(74) *Attorney, Agent, or Firm* — Ingrassia Fisher & Lorenz, LLP | IF&L

(57) ABSTRACT

Disclosed is a product that may include a vehicle seatback having a back face and an opposite front face and a first side face extending between the back face and a front face, the seatback having a frame, and a lock component connected to the frame, the lock component moveable from a first position wherein the first end of the lock component is a first distance from the first side face to a second position wherein a first end of the lock component is a second distance from the first side face, and wherein the second distance is shorter than the first distance.

20 Claims, 10 Drawing Sheets

SEATBACK FOLD FLAT WITH LOCK

INTRODUCTION

The technical field generally relates to vehicle seats and locking components and method of using the same.

BACKGROUND

Vehicles have seats with backs that may be folded to engage a seat bottom. However, installation and locking a seatback in a folded position at a consistent angle can be difficult and often results in inconsistent fold angles and can produce wrinkles due to crush condition of the seat soft trim.

Accordingly, it is desirable to provide a product including a vehicle seatback that can be moved to a folded position at a consistent angle and locked in place and easily unlock to move the seat to an upright position. Furthermore, other desirable features and characteristics of the variations disclosed herein will become apparent from the subsequent detailed description and the appended claims, taken in conjunction with the accompanying drawings and the foregoing.

SUMMARY

A number of variations disclosed may include a product which may include a vehicle seatback having a back face and an opposite front face and a first side face extending between the back face and a front face, the seatback having a frame, and a lock component connected to the frame, the lock component being moveable from a first position wherein the first end of the lock component is a first distance from the first side face to a second position wherein a first end of the lock component is a second distance from the first side face, and wherein the second distance is shorter than the first distance.

A number of variations disclosed may include a product wherein the lock component is spring-loaded and biased to the first position.

A number of variations disclosed may include a product wherein lock component is an elongated plate pivotally connected to the frame.

A number of variations disclosed may include a product wherein a spring is connected to a second end of the elongated plate and to the frame.

A number of variations disclosed may include a product wherein the lock component is a lock pin having a shaft and a spring is received on the shaft.

A number of variations disclosed may include a product wherein the seatback includes a mounting rod extending outboard of the first side face.

A number of variations disclosed may include a product further comprising a vehicle body bracket having a first slot for receiving the mounting rod.

A number of variations disclosed may include a product wherein the vehicle body bracket includes an opening for receiving a first end of the lock component.

A number of variations disclosed may include a product wherein the vehicle body bracket includes a curved surface above the opening and wherein the lock component is movable from the first position to move along the curved surface and into the opening.

A number of variations disclosed may include a product wherein the opening is a second slot.

A number of variations disclosed may include a product wherein the opening is a through hole.

A number of variations disclosed may include a product further comprising a first bushing and a spaced apart second bushing, wherein the lock pin extends through the first bushing and the second bushing, and a C clamp is attached to the shaft of the lock pin, and wherein the spring is positioned between the first bushing and the C clamp, and wherein the lock pin includes a radially extending flange at a second end of the lock pin, and wherein the elongated radially extending flange engages the first bushing and the first end of the lock pin is in the first position.

A number of variations disclosed may include a product wherein the lock pin is movable to the second position wherein the radially extending flange is positioned away from the first bushing.

A number of variations disclosed may include a product wherein the seatback is movable to a folded position wherein the lock component is received in the opening in the body bracket.

A number of variations disclosed may include a product wherein the body bracket includes a projection and the seatback being movable to an upright position wherein the lock component engages the projection to lock the seatback in the upright position.

A number of variations disclosed may include a product further comprising a seat bottom, and wherein the lock component engages at least one edge of the mounting bracket defining the opening when the seatback is in a folded position overlying the seat bottom.

A number of variations disclosed may include a product wherein the lock component is moveable by pushing, pulling, or rotating the lock component out of engagement with the projection.

A number of variations disclosed may include a product further comprising a release having a first end connected to the second end of the lock pin, and the release having a pullable second end to pull the lock pin from a position wherein the lock pin is received in an opening form in the body bracket or from engagement of the lock pin with a projection of the body bracket.

A number of variations disclosed may include a product a vehicle seatback having a back face and an opposite front face and a first side face extending between the back face and a front face, the seatback having a frame, and a lock component moveable from a first position wherein a first end of the lock component is a first distance from the first side face to a second position wherein the first end of the lock component is a second distance from the first side face, and wherein the second distance is shorter than the first distance; wherein the seatback includes a mounting rod extending outboard of the first side face; wherein the vehicle body bracket includes a first slot formed therein for receiving the mounting rod; wherein the vehicle body bracket includes an opening for receiving a first end of the lock component; wherein the vehicle body bracket includes a curved surface above the opening and wherein the lock component is movable from the first position to move along the curved surface and into the opening.

A number of variations disclosed may include a method that may include providing a vehicle seatback having a back face and an opposite front face and a first side face extending between the back face and a front face, the seatback having a frame, and a lock component moveable from a first position wherein a first end of the lock component is a first distance from the first side face to a second position wherein the first end of the lock component is a second distance from the first side face, and wherein the second distance is shorter than the first distance; wherein the seatback includes a mounting rod extending outboard of the first side face; wherein the vehicle body bracket includes a first slot formed therein for receiving the mounting rod; wherein the vehicle body bracket includes an opening for receiving a first end of the lock component; wherein the vehicle body bracket includes a curved surface above the opening and wherein the lock component is movable from the first position to move along the curved surface and into the opening; and a seat bottom having a top face; positioning the seatback over the seat bottom so that the front face of the seatback faces the top face of the seat bottom, and lowering the seatback toward the seat bottom so that the mounting rod is received in the first slot formed in the body bracket and the lock component moves along a curved surface of the body bracket and is received in the opening in the body bracket so that the seatback is locked in a folded position overlying the seat bottom.

BRIEF DESCRIPTION OF THE DRAWINGS

The variations will hereinafter be described in conjunction with the following drawing figures, wherein like numerals denote like elements, and wherein.

DETAILED DESCRIPTION

The following detailed description is merely illustrative in nature and is not intended to limit the application and uses. Furthermore, there is no intention to be bound by any expressed or implied theory presented in the preceding technical field, background, brief summary or the following detailed description.

Figure 1:
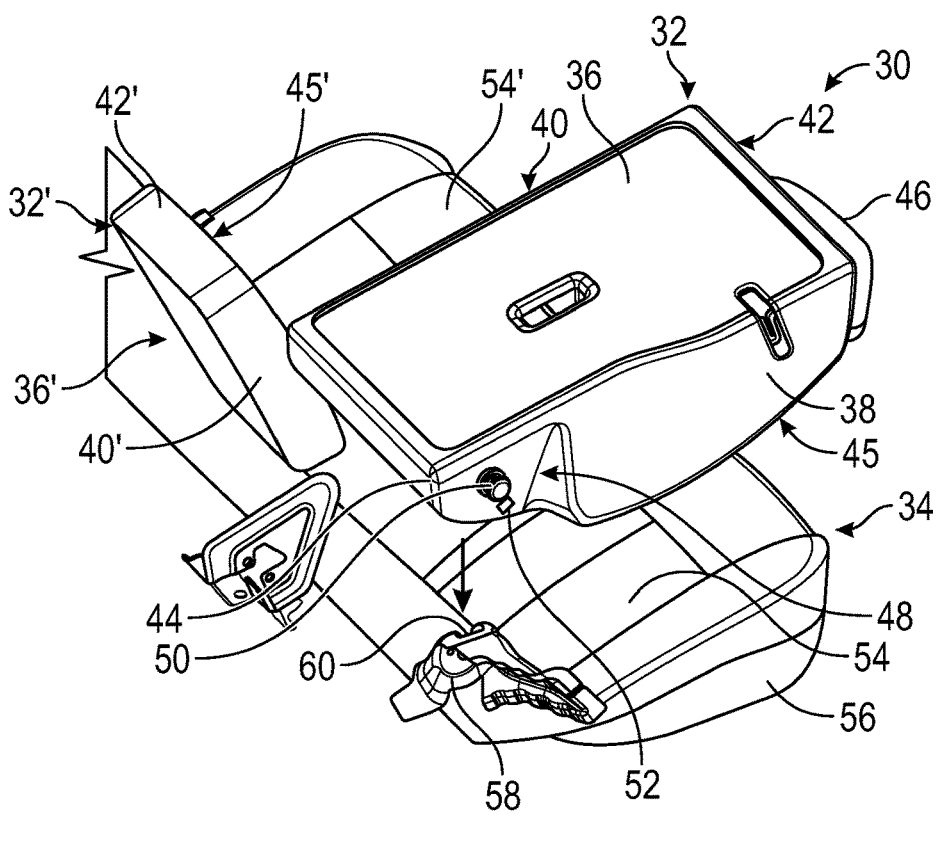
FIG. 1 is a perspective, rear view of a product which may include a seatback a mounting rod and a lock component, wherein the seatback is position to start installing the same to a vehicle body bracket according to a number of variations.
Figure 2:
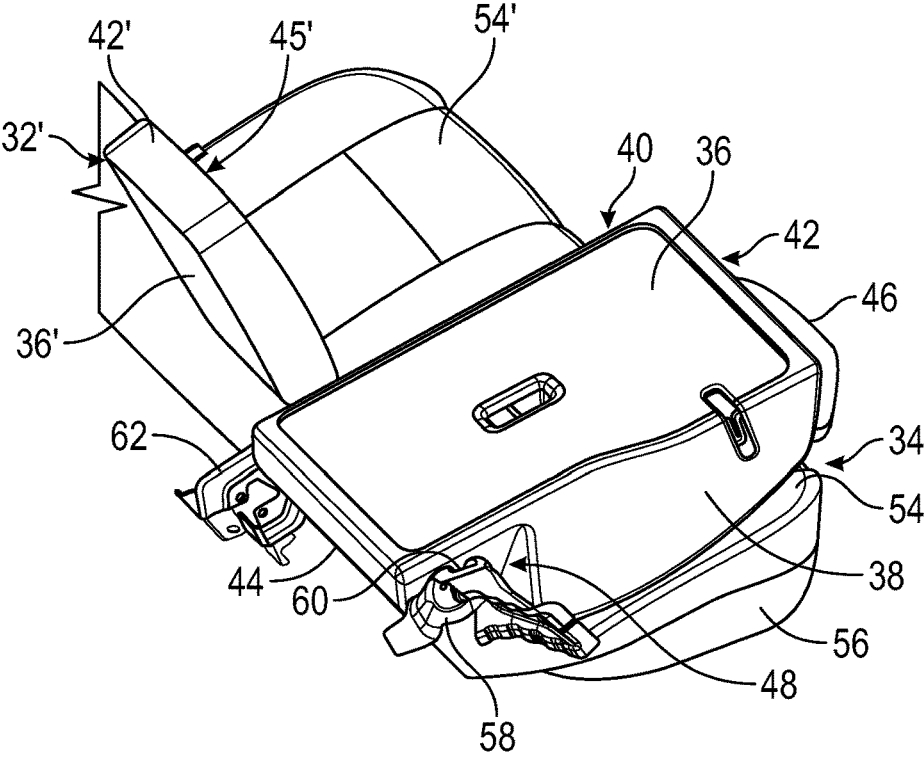
FIG. 2 is a perspective, rear view seatback mounted to a vehicle body bracket and a folded position overlying a seat bottom according to a number of variations.

FIG. 1 is a perspective view of a product 30 which may be a vehicle seat assembly which may include a seatback 32. The product 30 may also include a seat bottom 34. Both the seatback 32 and the seat bottom 34 may include a frame and stuffing which may be a polymeric foam over the frame, and upholstery or trim over the stuffing in a manner known to those skilled in the art. The seatback 32 may include a back face 36, a first side face 38 and an opposite second side face 40 both joining the back face 36. A top face 42 and a bottom face 44 may both join the back face 36 at opposite ends. A headrest 46 may be attached to the seatback 32. The first side face 38 may have a recessed portion 48. A mounting rod 50 may extend outboard of the first side face 38 and a lock component 52 may also extend outboard of the first side face 38 at a location near the mounting rod 50. The seat bottom 34 may include a top face 54 and a side face 56. A body bracket 58 may be mounted to the frame (not shown) of the vehicle (not shown). The body bracket 58 may include a first slot 60 formed therein to receive the mounting rod 50 during assembly. FIG. 2 illustrates the seatback 32 mounted to the body bracket 58 in a folded position wherein the front face 45 of the seatback 32 is adjacent the top face 54 of the seat bottom 34. The seat bottom 34 may be a single seat bottom or a bench type seat bottom including a second seat bottom portion 54', with a second seatback 32', having similar features as seatback 32.

Figure 3:
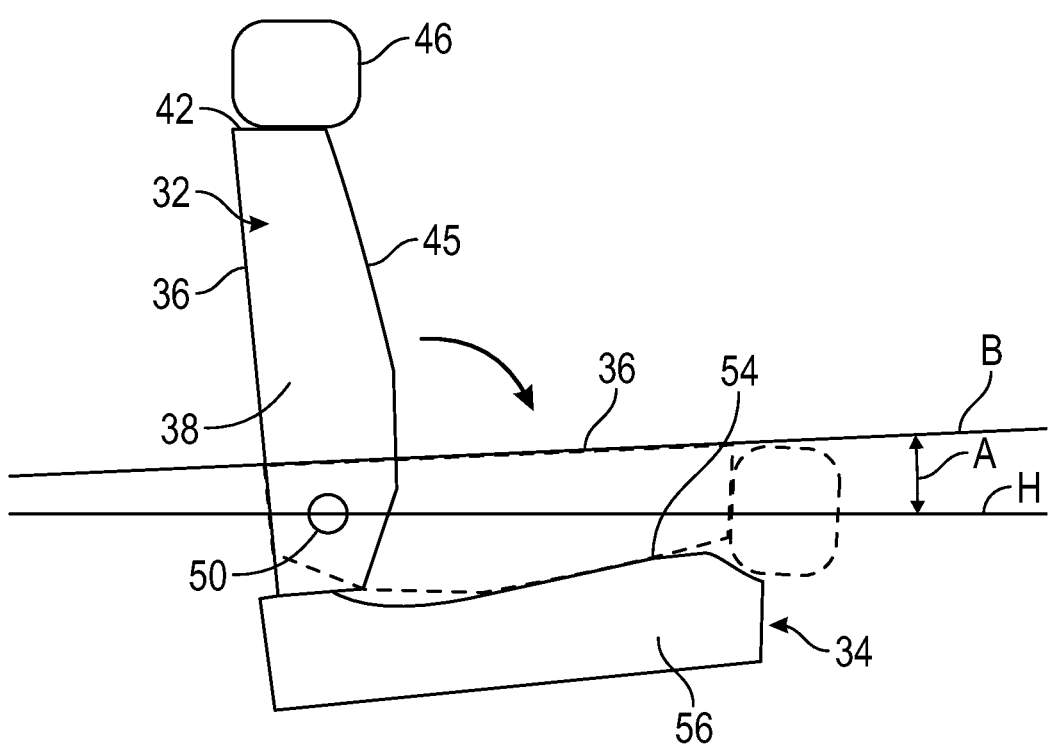
FIG. 3 is a schematic side view of a vehicle seatback in an upright position and showing with phantom lines movement of the seatback to a folded position according to a number of variations.

FIG. 3 is a schematic view illustrating the movement of the seatback 32 to a folded position, shown with phantom lines, wherein the front face 45 of the seatback 32 is adjacent the top face 54 of the seat bottom 34. In the folded position, imaginary line B running parallel to the back face 36 of the seatback 32 and an imaginary horizontal line H form an angle A which is consistent each time the seatback 32 is folded over the seat bottom 34.

Figure 4:
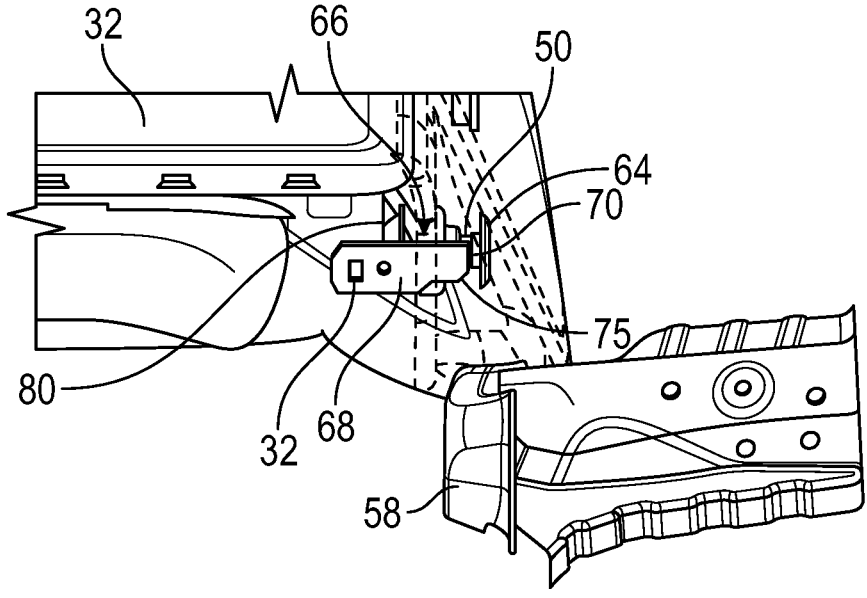
FIG. 4 is a partial, rear view, illustrating a vehicle seatback having a lock component according to a number of variations.

FIG. 4 is a partial view with portions removed showing a lock component 66 pivotably mounted to a frame 80 of the seatback 32. In a number of variations, the lock component 66 may be an elongated plate 68 having a first end 70 and an opposite second end 72. The first end 70 may include a chamfered or rounded portion 75 which engages the body bracket 58 during installation of the seatback 32.

Figure 5:
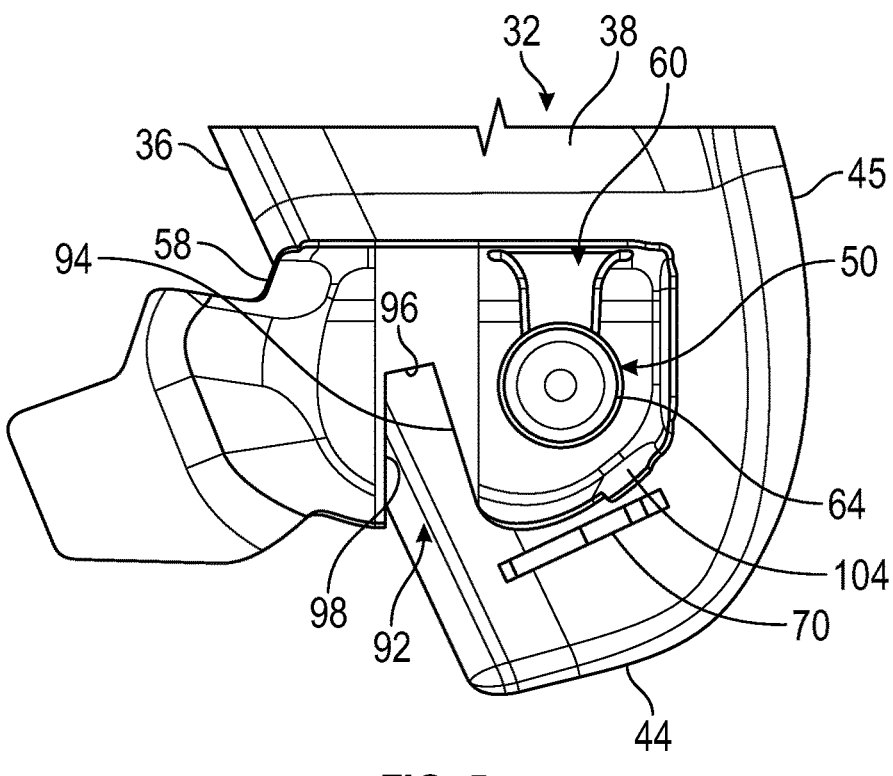
FIG. 5 is a partial, side view of a seatback mounted to a body bracket wherein the seatback is in an upright position according to a number of variations.
Figure 6:
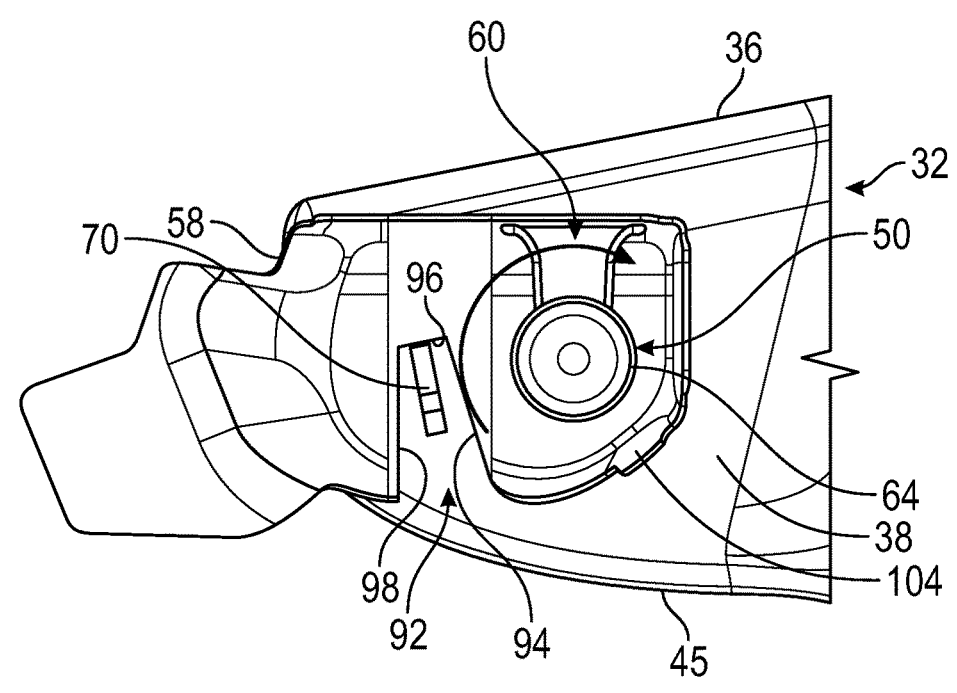
FIG. 6 is a partial, side view of a seatback mounted to a body bracket wherein the seatback is in a folded position according to a number of variations.
Figure 7:
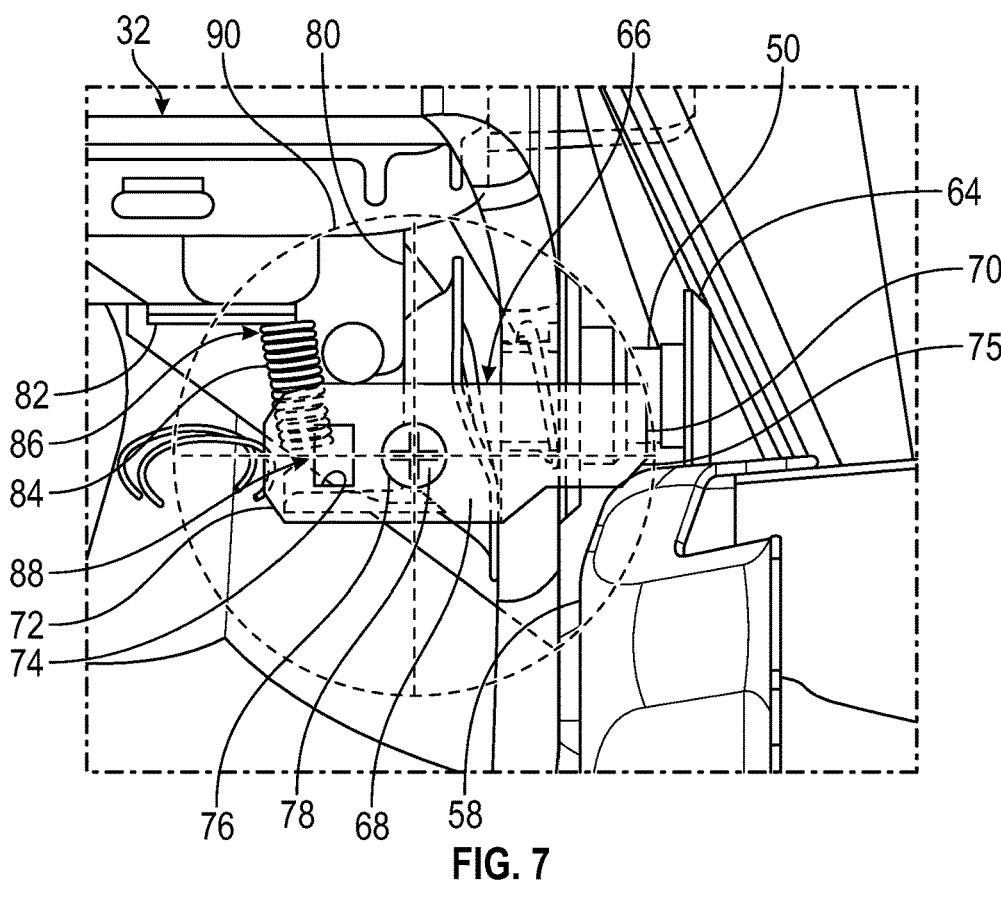
FIG. 7 is a partial, rear view of a vehicle seatback being installed wherein the lock component engages a curved surface of a vehicle body bracket according to a number of variations.
Figure 8:
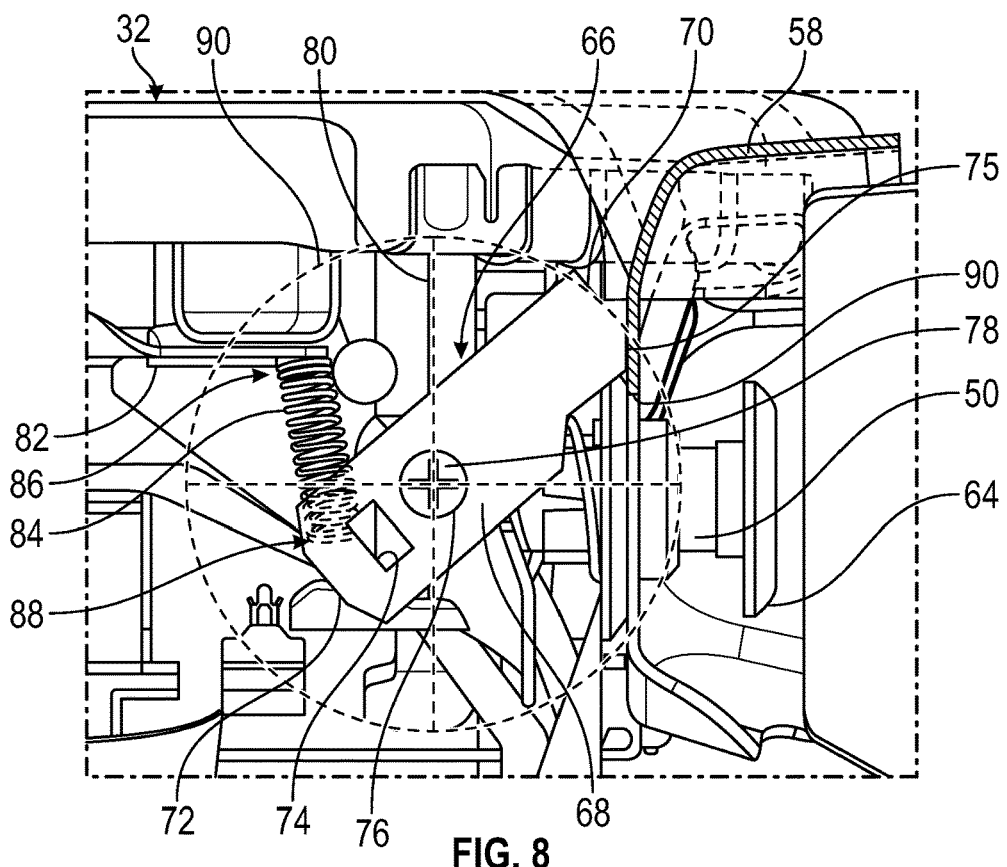
FIG. 8 is a partial, rear view of a vehicle seatback being installed wherein the lock component engages a curved surface of a vehicle body bracket according to a number of variations.
Figure 9:
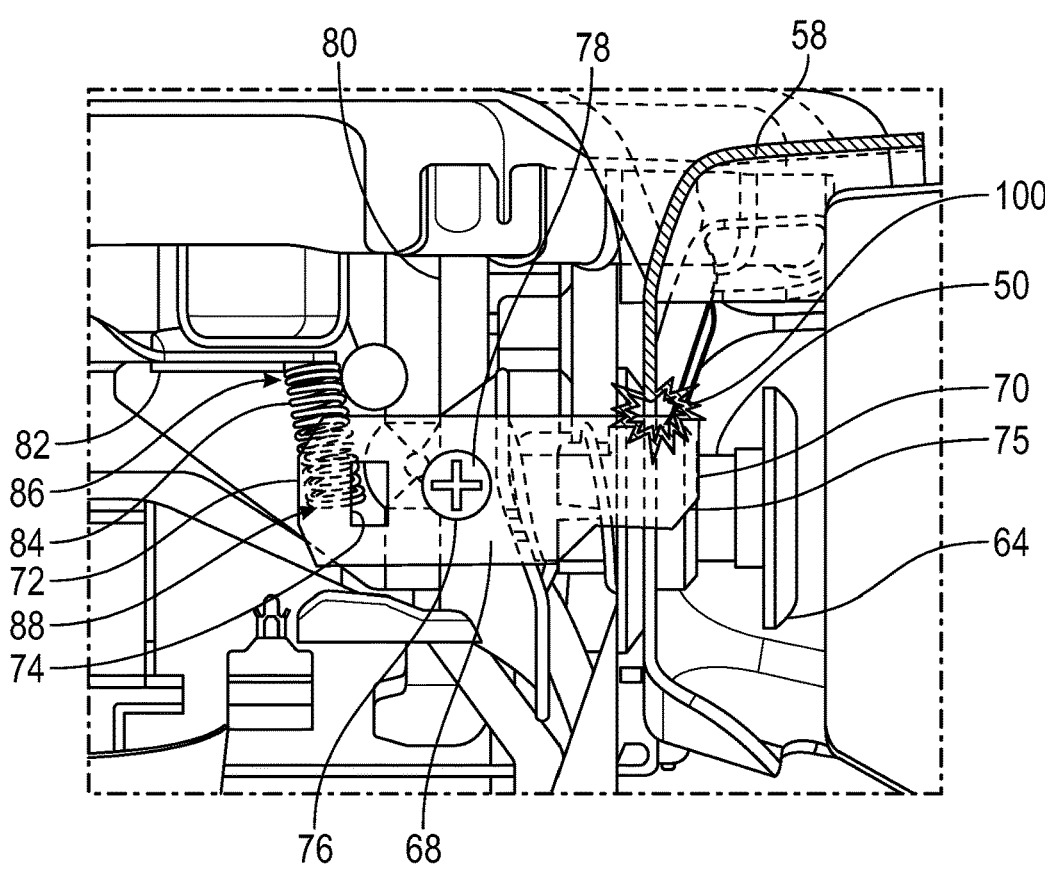
FIG. 9 is a partial, rear view of a vehicle seatback being installed wherein the lock component being received in an opening of a vehicle body bracket to lock the seatback in a folded position according to a number of variations.

FIG. 7 is a rear view with portions removed showing the engagement of the elongated plate 68 with the body bracket 58 as the seatback 32 is lowered downward towards the seat bottom 34 and the radially extending flange portion 64 of the mounting rod 50 enters the first slot 60 shown in FIGS. 5 and 6. FIG. 8 illustrates the counterclockwise movement of the first end 70 of the elongated plate 68 as the seatback 32 is lowered further downward. As the seatback 32 is lowered further downward the first end 70 of the elongated plate 68 travels or moves along a curved surface 59 of the body bracket 58. As the seatback 32 is lowered down while the elongated plate 68 engages the body bracket 58 the spring 84 is elongated and stores energy. FIGS. 6 and 9 illustrate the seatback in a folded and locked position wherein the first end 70 of the elongated plate 68 is received in an opening or a recess. In a number of variations, the first end 70 of the elongated plate 68 is received in a second slot 92 formed in the body bracket 58. In the locked position, movement of the seatback towards an upright position is blocked by the engagement 100 of the elongated plate 68 with a base edge 96, front edge 94, or rear edge 98 defining the second slot 92 in the body bracket 58.

Figure 10:
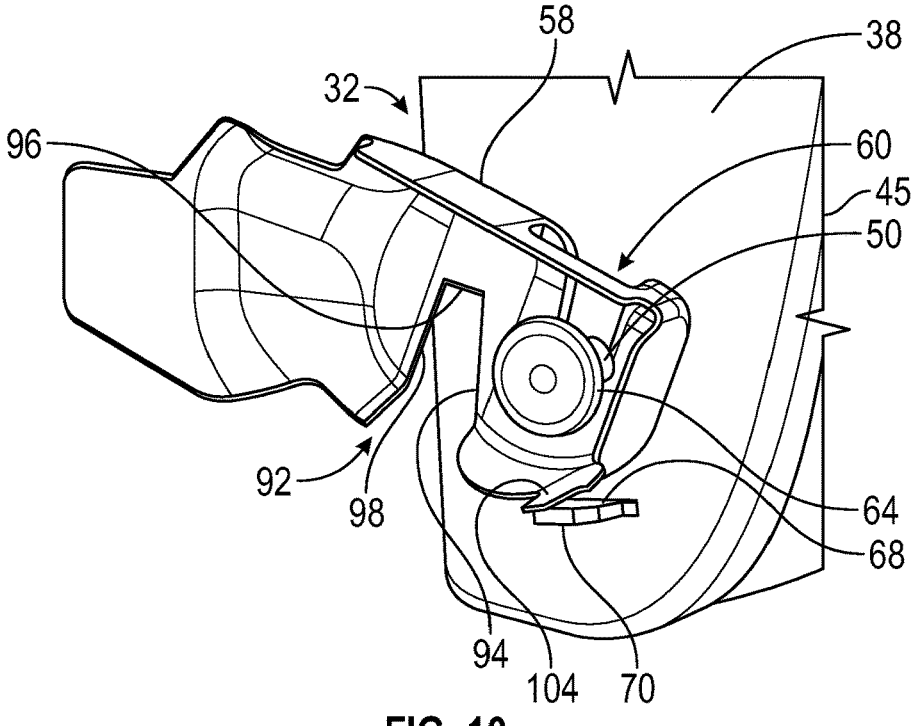
FIG. 10 is a partial, side view of a vehicle seatback in an upright position with a lock component engaging a projection of the body bracket to lock the seatback in the upright position according to a number of variations.

Referring to FIGS. 5, 8, and 10, to unlock the seatback 32 from the locked and folded position the first end 70 of the elongated plate 68 may be pushed downward so that the first end 70 of the elongated plate 68 rotates clockwise along the imaginary circle 90 and so that the seatback 32 may be rotated towards an upright position without the first end 70 of the elongated plate 68 engaging the front edge 94, base edge 96, or rear edge 89 defining the second slot 92 in the body bracket 58. As the seatback 32 is rotated towards an upright position the elongated plate 68 is moved by the spring 84 back in the counterclockwise direction until the first end 70 of the elongated plate 68 moves past a projection 104 of the body bracket 58. The first end 70 of the elongated plate 68 engages the projection 104 locking the seatback 32 in an upright position. The first end of the elongated plate 68 may be pushed causing the elongated plate to rotate out of engagement with the projection 104 so that the seatback 32 may be moved to a from the upright position to, for example, a folded position overlying the seat bottom 34.

Figure 11:
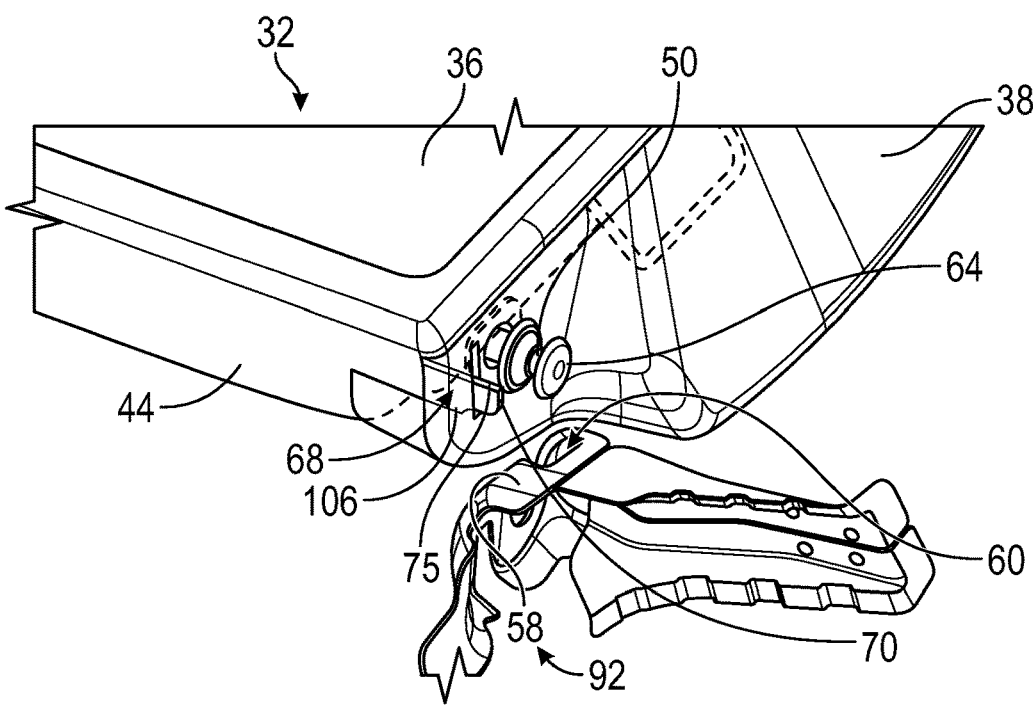
FIG. 11 is a partial, perspective rear view of the vehicle seatback having a mounting rod and a lock component position to be installed in a vehicle body bracket according to a number of variations.
Figure 12:
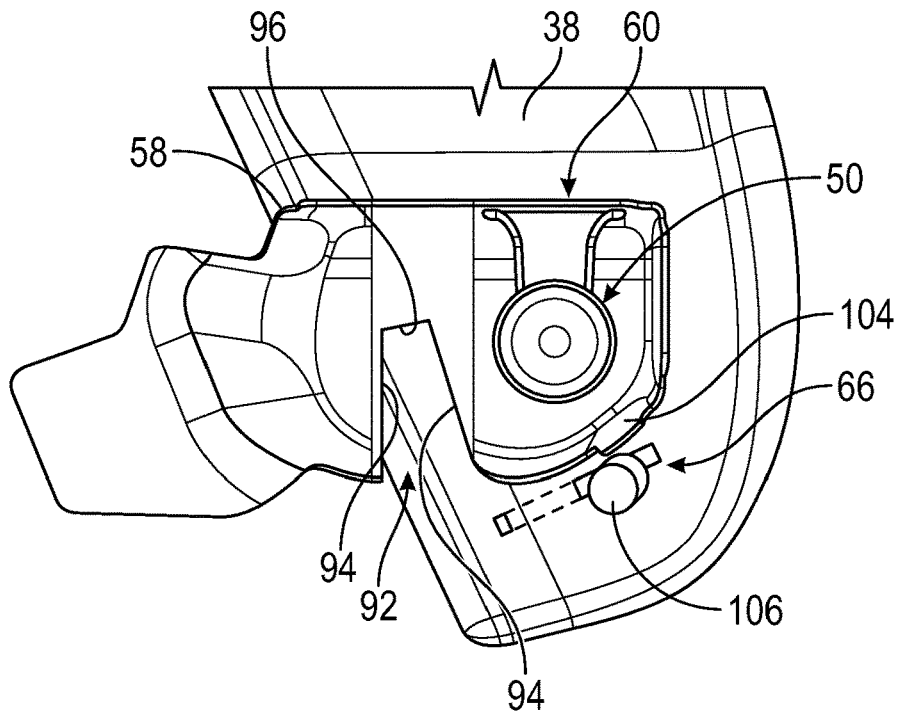
FIG. 12 is a partial side view of a vehicle seatback in an upright position wherein the lock component engages a projection of the body bracket to lock the seatback in the upright position according to a number of variations.
Figure 13:
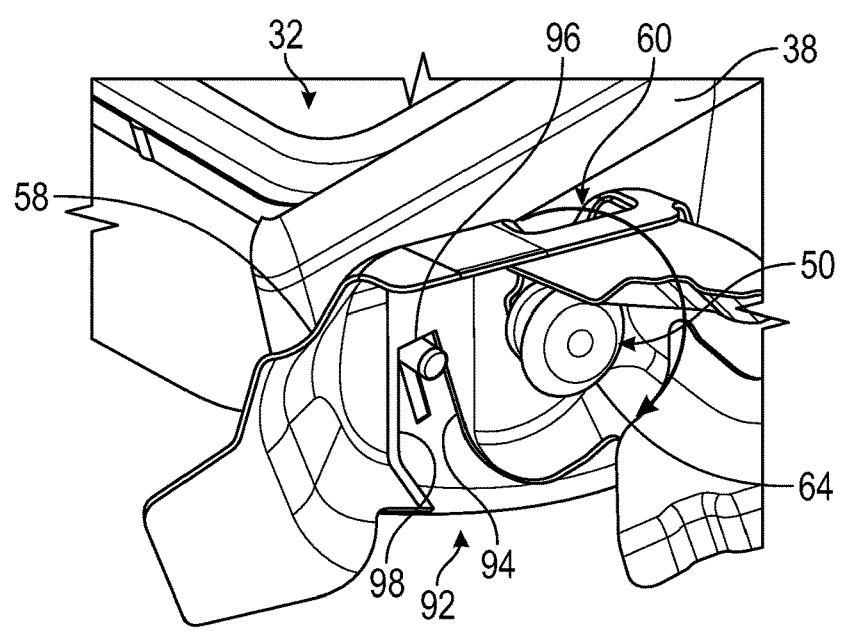
FIG. 13 is a partial, perspective rear view of the seatback mounted to a body bracket wherein the lock component is received in an opening formed in the body bracket to lock the seatback in a folded position according to a number of variations.
Figure 14:
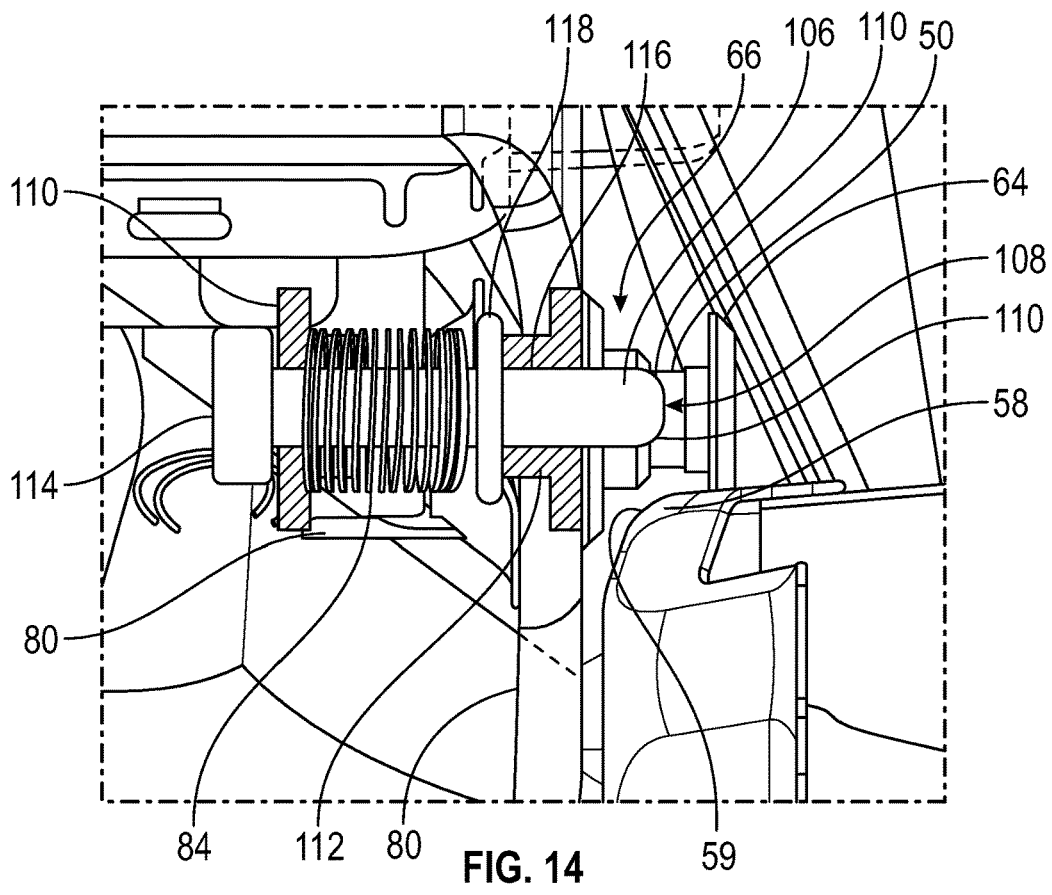
FIG. 14 is a partial, rear view with portions removed illustrating a seatback being mounted to a body bracket according to a number of variations.
Figure 16:
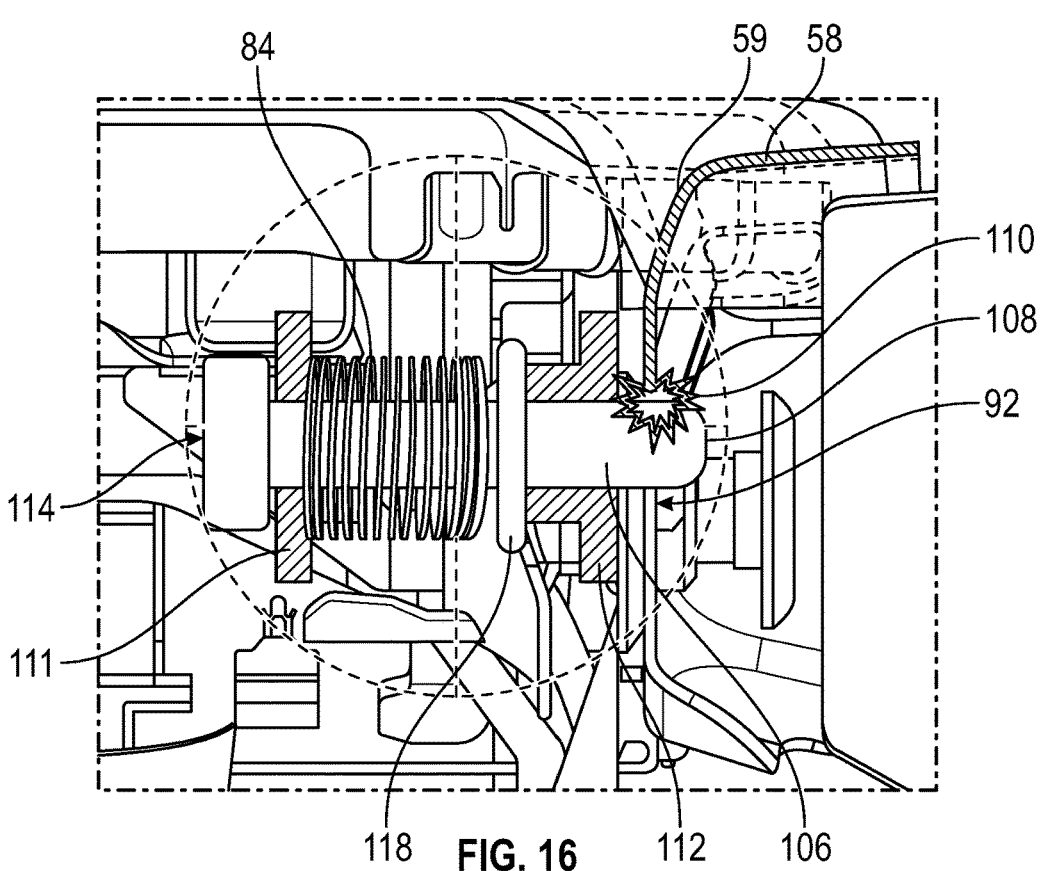
FIG. 16 is a partial, rear view with portions removed illustrating a seatback mounted to a body bracket wherein the lock component is received in an opening of the body bracket to lock the seatback in a folded position according to a number of variations position according to a number of variations.
Figure 17:
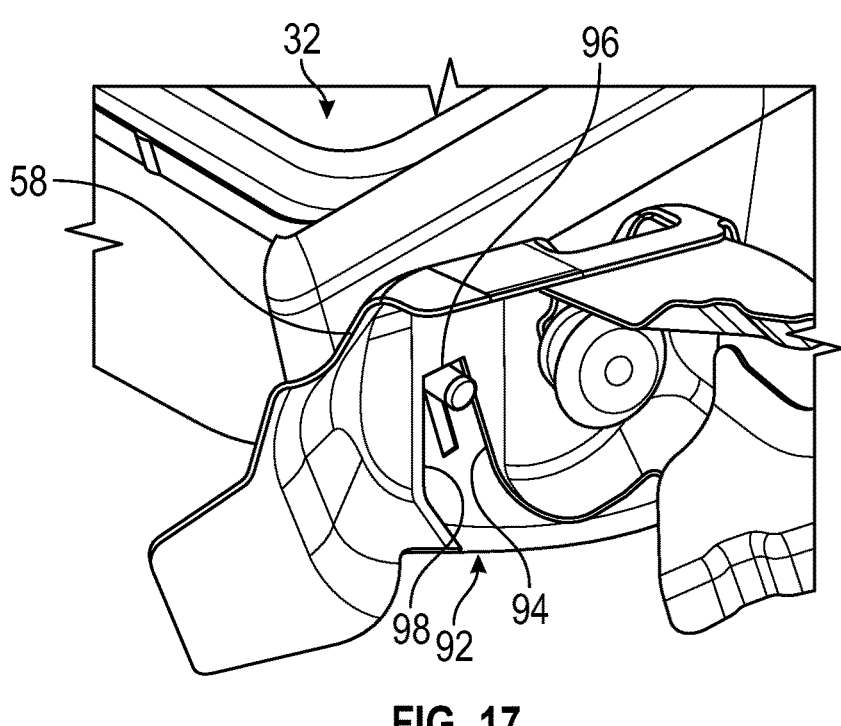
FIG. 17 is a perspective, rear view of a seatback mounted to a body bracket wherein the lock component is received in an opening of the body bracket to lock the seatback in a folded position according to a number of variations.
Figure 18:
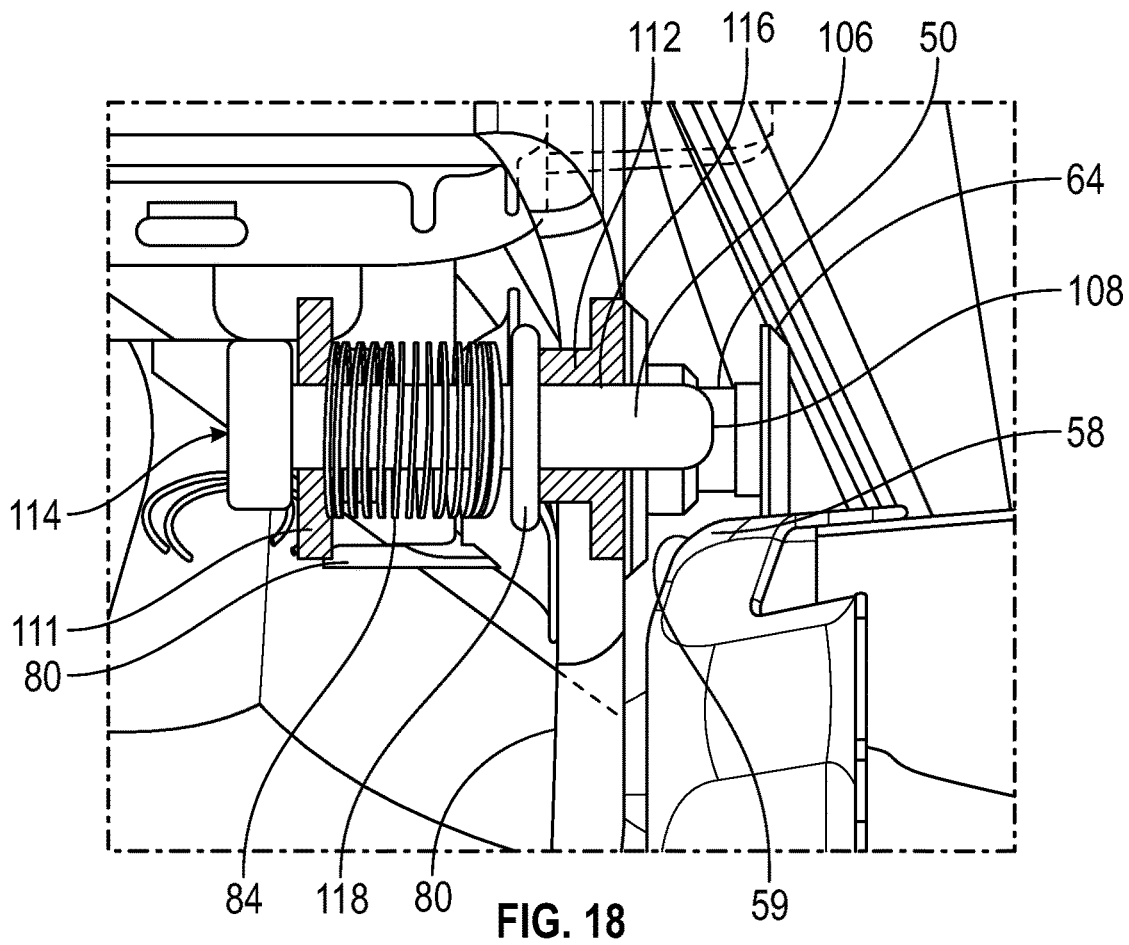
FIG. 18 is a partial, rearview showing a seatback being mounted to a body bracket according to a number of variations.
Figure 19:
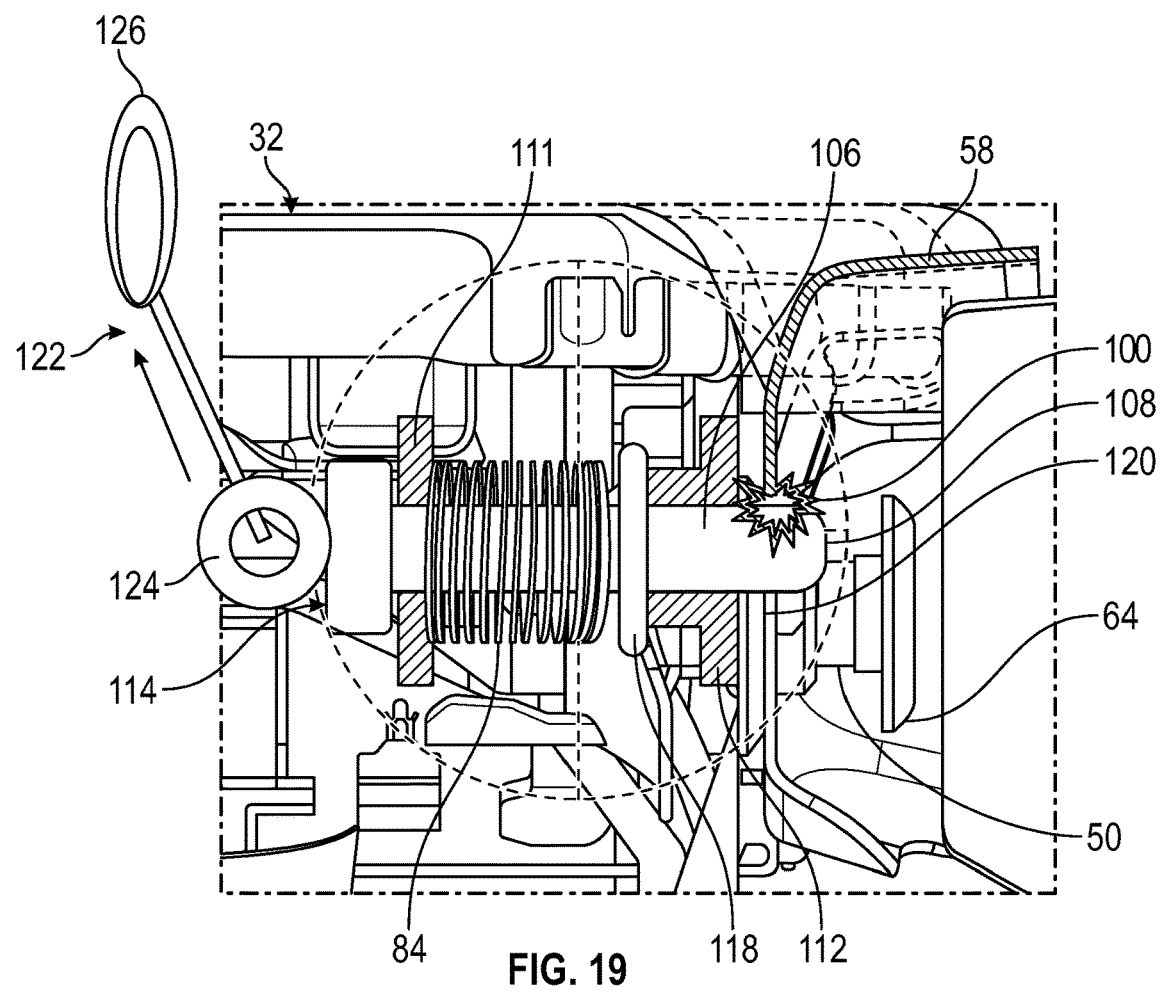
FIG. 19 is a partial, rear view with portions removed showing a seatback with a lock component being received in an opening formed in a body bracket to lock the seatback in a folded position according to a number of variations.

Referring to FIGS. 11-20, in another variation, a spring loaded lock pin 106 serves as a lock component 66. FIGS. 11, 14, and 18 illustrate the seatback 32 positioned to be mounted to the body bracket 58 wherein the mounting rod 50 having a flange portion 64 would be received in the first slot 60 formed in the body bracket 18 and so that the lock pin 106 travels or moves along a curved surface 59 of the body bracket 58.

Figure 20:
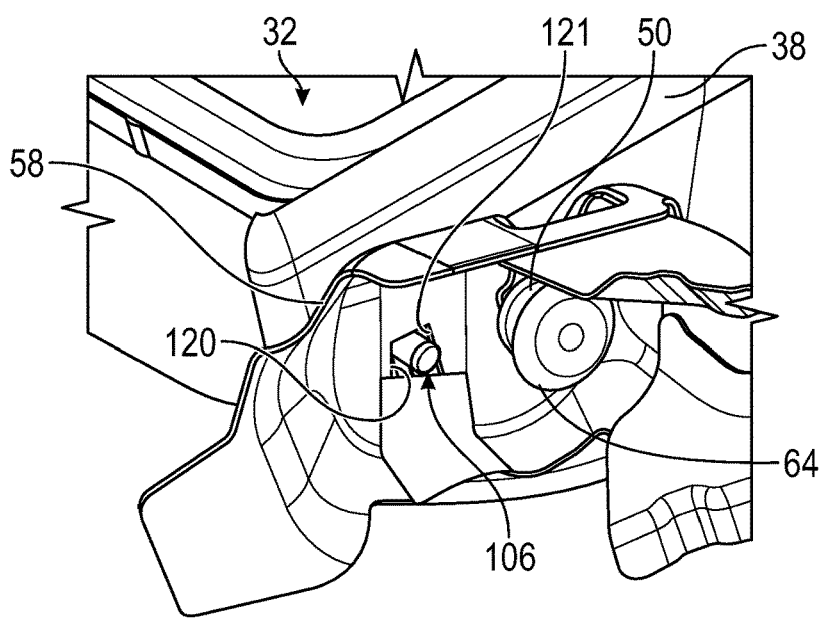
FIG. 20 is a partial, perspective view of a seatback having a lock component extending through an opening of a body bracket according to a number of variations.

Referring to FIGS. 12-13, and 20, to unlock the seatback 32 from the locked folded position the first end 108 of the lock pin 106 may be pushed inward toward the first side face 38 so that the first end 108 of the lock pin 106 is moved out of the second slot 92 (FIG. 13), opening through hole 120 (FIG. 20) in the body bracket 58 so that the seatback 32 may be moved from the folded position, for example to an upright position. When the seatback 32 is in the upright position (FIG. 12) and the first end 108 of the lock pin 106 engages the projection 104 to lock the seatback 32 in the upright position. The first end 108 of the lock pin 106 may be pushed inward toward the first side face 38 of the seatback 32 causing the lock pin 106 to move out of engagement with the projection 104 so that the seatback 32 may be moved from the upright position to, for example, a folded position overlying the seat bottom 34.

Figure 15:
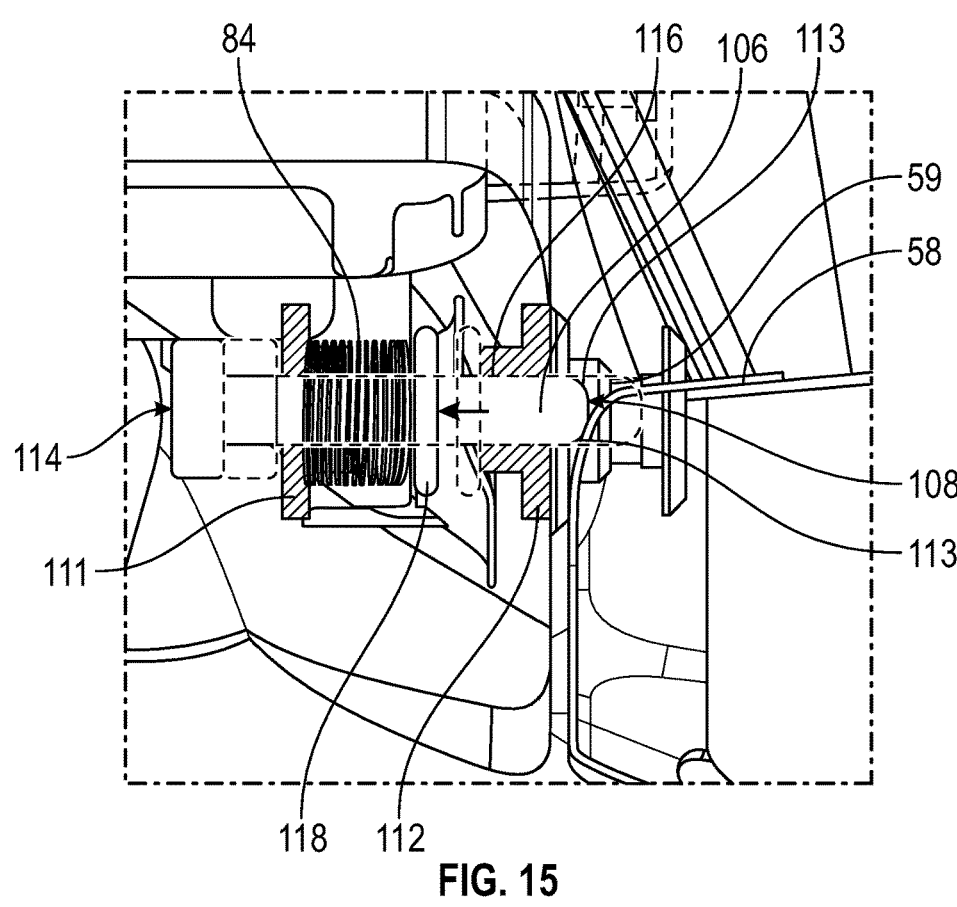
FIG. 15 is a partial, rear view with portions removed illustrating a seatback being mounted to a body bracket wherein the lock component engages a curved surface of the body bracket according to a number of variations.

FIG. 14 is a rear view with portions removed showing the lock pin 106 being received through a first bushing 111 and a second bushing 112 that are spaced apart from each other and mounted to portions of the frame 80. The lock pin 106 may have a second end 114 which extends radially outward from a shaft portion 116 of the lock pin 106. A spring 84 may be received on the shaft portion 116 of the lock pin and held in position by the first bushing 111 near the second end 114 of the lock pin 106 and a C clamp 118 secured to the shaft portion 116 positioned closer to the second bushing 112 than the first bushing 111. The first end 108 of the lock pin 106 may have at least one or more curved portions 113 to facilitate the travel of the first end 108 along a curved surface 59 of the body bracket 58. Referring to FIG. 15, as the first end 108 travels or moves along the curved surface 59 of the body bracket 58 the lock pin 106 is pushed so that the second end 114 moves away from the first bushing 111 and the spring 84 is compressed storing energy.

FIGS. 16-17 illustrate the first end 108 of the lock pin 106 may be received an opening or recess. In a number of variations, first end 108 of the lock pin 106 may be received in the second slot 92 formed in the body bracket 58 so that the seatback 32 is in a folded and locked position and movement of the seatback 32 is prevented by engagement 110 with the front edge 94, the base edge 96, or the rear edge 98 defining the second slot 92. FIG. 13 illustrates the seatback 32 in a folded and locked position wherein the lock pin 106 is received in the second slot 92 formed in the body bracket 58.

Referring to FIGS. 15, and 18-20, in another variation, a through hole 120 may be formed in the body bracket 58 so that as the first end 108 travels or moves along the curved surface 59 of the body bracket 58 the lock pin 106 is pushed so that the second end 114 of the lock pin 106 moves away from the first bushing 111 and the spring 84 is compressed storing energy. When the first end 108 of the lock pin 106 reaches the through hole 120 the stored energy in the spring 84 forces the first end 108 of the lock pin 106 into the through hole 120. The seatback 32 is locked in position by engagement 110 with one or more edges 121 defining the through hole 120. A release 122 may be provided having a first end 124 secured to the second end 114 of the lock pin 106. A second end 126 of the release 122 may be a ring that a driver or passenger can grab and pull the second end 114 of the lock pin 106 so that the first end 108 of the lock pin 106 moves out of the through hole 120 to facilitate rotation of the seatback to an upright position.

While at least one illustrative variation has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A product comprising:
a vehicle seatback having a back face and an opposite front face and a first side face extending between the back face and a front face, the vehicle seatback having a frame, and a lock component connected to the frame, the lock component moveable from a first position where a first end of the lock component is disposed a first distance from the first side face to a second position where the first end of the lock component is disposed a second distance from the first side face, wherein the second distance is shorter than the first distance, and wherein the lock component is moveable so the first end of the lock component travels or moves along a curved surface of a vehicle body bracket.

2. The product as set forth in claim 1, wherein the lock component is spring-loaded and biased to the first position.

3. The product as set forth in claim 2, wherein the lock component is an elongated plate pivotally connected to the frame.

4. The product as set forth in claim 3, wherein a spring is connected to a second end of the elongated plate and to the frame.

5. The product as set forth in claim 2, wherein the lock component is a lock pin having a shaft and a spring is received on the shaft.

6. The product as set forth in claim 1, wherein the vehicle seatback includes a mounting rod extending outboard of the first side face.

7. The product as set forth in claim 6, wherein the vehicle body bracket has a first slot for receiving the mounting rod.

8. The product as set forth in claim 7, wherein the vehicle body bracket includes a projection and the vehicle seatback being movable to an upright position wherein the lock component engages the projection to lock the vehicle seatback in the upright position.

9. The product as set forth in claim 8, wherein the lock component is moveable by pushing, pulling, or rotating the lock component out of engagement with the projection.

10. The product as set forth in claim 7, wherein the vehicle body bracket includes an opening for receiving the first end of the lock component.

11. The product as set forth in claim 10, wherein the curved surface of the vehicle body bracket is above the opening and wherein the lock component is movable from the first position to move along the curved surface and into the opening.

12. The product as set forth in claim 10, wherein the opening is a second slot.

13. The product as set forth in claim 10, wherein the opening is a through hole.

14. The product as set forth in claim 13, further comprising a first bushing and a spaced apart second bushing, wherein the lock pin extends through the first bushing and the second bushing, and a C clamp is attached to the shaft of the lock pin, and wherein the spring is positioned between the first bushing and the C clamp, and wherein the lock pin includes a radially extending flange at a second end of the lock pin, and wherein the radially extending flange engages the first bushing and the first end of the lock pin is in the first position.

15. The product as set forth in claim 14, wherein the lock pin is movable to the second position wherein the radially extending flange is positioned away from the first bushing.

16. The product is set forth in claim 14, further comprising a release having a release first end connected to the second end of the lock pin, and the release having a pullable second end to pull the lock pin from a position wherein the lock pin is received in an opening form in the vehicle body bracket or from engagement of the lock pin with a projection of the vehicle body bracket.

17. The product is set forth in claim 10, wherein the vehicle seatback is movable to a folded position wherein the lock component is received in the opening in the vehicle body bracket.

18. The product as set forth in claim 17, further comprising a seat bottom, and wherein the lock component engages at least one edge of the vehicle body bracket defining the opening when the vehicle seatback is in the folded position overlying the seat bottom.

19. A product comprising:
a vehicle seatback having a back face and an opposite front face and a first side face extending between the back face and a front face, the vehicle seatback having a frame, and a lock component moveable from a first position where a first end of the lock component is disposed a first distance from the first side face to a second position where the first end of the lock component is disposed a second distance from the first side face, wherein the second distance is shorter than the first distance;
wherein the vehicle seatback includes a mounting rod extending outboard of the first side face;
a vehicle body bracket includes a first slot formed therein for receiving the mounting rod;
wherein the vehicle body bracket includes an opening for receiving the first end of the lock component;
wherein the vehicle body bracket includes a curved surface above the opening and wherein the lock component is movable from the first position to move along the curved surface and into the opening.

20. A method comprising:
providing a vehicle seatback having a back face and an opposite front face and a first side face extending between the back face and a front face, the vehicle seatback having a frame, and a lock component moveable from a first position where a first end of the lock component is disposed a first distance from the first side face to a second position where the first end of the lock component is disposed a second distance from the first side face, wherein the second distance is shorter than the first distance; wherein the vehicle seatback includes a mounting rod extending outboard of the first side face; a vehicle body bracket having a first slot formed therein for receiving the mounting rod; wherein the vehicle body bracket includes an opening for receiving the first end of the lock component; wherein the vehicle body bracket includes a curved surface above the opening and wherein the lock component is movable from the first position to move along the curved surface and into the opening; and a seat bottom having a top face;
positioning the vehicle seatback over the seat bottom so that the front face of the vehicle seatback faces the top face of the seat bottom, and lowering the vehicle seatback toward the seat bottom so that the mounting rod is received in the first slot formed in the vehicle body bracket and the lock component moves along the curved surface of the vehicle body bracket and is received in the opening in the vehicle body bracket so that the vehicle seatback is locked in a folded position overlying the seat bottom.

\* \* \* \* \*